106. COMPOSITIONS, COATING OR PLASTIC.

Patented Feb. 26, 1935

1,992,867

UNITED STATES PATENT OFFICE 1,992,867

GLUE AND PROCESS FOR MANUFACTURING THE SAME

Otis Johnson, Tacoma, Wash.

No Drawing. Application February 4, 1933, Serial No. 655,291

15 Claims. (Cl. 87—17)

My invention relates to the process of manufacturing a glue, employing as a base therefor, cotton or wood pulp, or both, a process which is novel and useful, as lint cotton can be used and a superior cheap glue produced.

In carrying out my invention I prepare an alkaline solution, dissolving in one thousand parts of water, one hundred to three hundred pounds "alkaline salts", preferably sodium hydroxide, which solution I place in a horizontal cylinder, containing pegs or baffles; into this solution I preferably dissolve from two to five pounds of sodium chloride, one half to two and one half lbs. of copperas, and from one fourth to one pound of bichromate of potash. These latter three named chemicals may, however, be added at later stages of the process as hereinafter mentioned; some or all of these may be omitted with fair result. Then into the said cylinder and solution I place either one hundred pounds of vegetable fibre such as cotton lint, or of wood pulp, or one hundred pounds of a mixture of lint cotton and wood pulp. Then by mechanical means I revolve the said cylinder, until the contents are thoroughly saturated, which will take from one to two hours, depending on the speed which the cylinder revolves and the material to be saturated. Then I pour the mass from the cylinder on a screen drain, allowing such free moisture as will drain from the mass. Then I place the remaining mass in a beating or grinding device for the purpose of separating all the fibre.

Then I place in either a press or wringing device, extracting the moisture until the mass will weigh from two to four hundred pounds. Then I run the remaining mass through a shredding device which will completely separate all the fibres, further during the shredding process the sodium chloride, copperas and bichromate of potash as hereinbefore mentioned may be added if not added previously.

Then I place this shredded mass into another cylinder, which will withstand an inside pressure of at least ten pounds per square inch. Into this cylinder and mass I place from twenty five to fifty pounds of carbon bisulphide. Other similar solvents may be used. I then revolve the cylinder from two to eight hours, then allow the cylinder to remain stationary from ten to forty-eight hours thus converting the fibers into viscose.

I then remove the mass from the cylinder, when it may be further ground or pulverized if speed is required in dissolving to complete the glue making. Then into a suitable glue mixer I place three hundred pounds of water, dissolving therein from two to ten pounds of sodium hydroxide and from one to five pounds of trisodium phosphate. Into this solution also may be added one half pound of dry sodium silicate or other hardening agent. Then into the solution I place from thirty to sixty pounds of the ground mass and stir from ten to thirty minutes or until the mass is completely dissolved, and of the proper consistency for spreading as a glue.

Into this liquid glue may be mixed casein, soy bean meal, or other equivalent such as peanut meal, cassava flour, and cotton seed meal in proportions of from ten to ninety per cent of either mixture, which mixture renders the casein, cassava flour and meals waterproof for glue purposes. Furthermore the casein, soy bean, etc., have the function of hardening the glue line when the glue is applied.

It will be understood that the specific example herein given is for the purpose of illustrating the invention, and that proportions of parts may be varied and some of the elements mentioned may be omitted without departing from the spirit of the invention, and therefore reference is to be had to the appended claims to define the limits thereof.

I claim:

1. The process of making glue from cotton and wood pulp, which consists in digesting the same in an alkaline solution into which has been added sodium chloride, copperas and bichromate of potash, separating and pulverizing the mass by grinding, eliminating moisture, shredding the fibers, converting the fibers into viscose, and then placing the mass in a solution of sodium hydroxide, tri-sodium phosphate and sodium silicate.

2. The process of making glue from cotton or wood pulp, which consists in digesting the same in an alkaline solution to which has been added sodium chloride, copperas and bichromate of potash, separating and pulverizing the fibers, eliminating moisture, shredding the fibers, converting the fibers into viscose, placing the mass in a solution of sodium hydroxide, tri-sodium phosphate and sodium silicate, and then stirring the mass to a glue consistency.

3. The process of making glue, which consists in digesting cotton or wood fibers in an alkaline solution, separating and pulverizing the fibers, pressing out moisture, shredding the fibers and adding sodium chloride, copperas and bichromate of potash thereto, converting the fibers into viscose by the action of a solution of carbon bisulphide, then adding a solution of sodium hydroxide, trisodium phosphate and sodium silicate, and reducing the mass to a glue consistency.

4. The process of making a glue from vegetable fibers which consists in digesting the fibers in an alkaline solution containing sodium chloride, copperas and bichromate of potash, disintegrating the fibers, pressing out moisture therefrom, converting the fibers into viscose, and then placing the dissolved mass in a solution of sodium hydroxide, trisodium phosphate and sodium silicate.

5. The process of making a glue from cotton fibers which consists in digesting said fibers in an alkaline solution containing sodium chloride, copperas and bichromate of potash, pulverizing the fibers, removing moisture therefrom, converting the fibers into viscose, and then placing the mass in a solution containing sodium hydroxide, trisodium phosphate and sodium silicate.

6. The process of making a glue which consists in digesting wood fibers in an alkaline solution containing sodium chloride, copperas and bichromate of potash, pulverizing the fibers, removing moisture therefrom, converting the fibers into viscose, and then placing the dissolved mass in a solution of sodium hydroxide, trisodium phosphate and sodium silicate.

7. The process of making a glue from vegetable fibers which consists in digesting the fibers in an alkaline solution, then pulverizing the fibers, pressing out moisture, then adding sodium chloride, copperas and bichromate of potash, then converting the fibers into viscose, then placing the mass in a solution of sodium hydroxide, and stirring the same to a glue spreading consistency.

8. The process of making a glue from vegetable fibers which consists in digesting the fibers in an alkaline solution, then pulverizing the fibers and removing moisture therefrom, then converting the fibers into viscose, then adding the mass to a solution of trisodium phosphate and sodium silicate, and stirring the same to a glue spreading consistency.

9. The process of making a glue, which consists in digesting vegetable fibers in an alkaline solution, disintegrating the fibers and removing moisture therefrom, then converting the fibers into viscose, and then adding the mass to a solution containing sodium hydroxide, trisodium phosphate and sodium silicate, and then adding soy bean meal.

10. The process of making a glue which consists in digesting vegetable fibers in an alkaline solution, disintegrating the fibers and removing moisture therefrom, then converting the fibers into viscose, adding the digested mass to a solution containing sodium hydroxide, trisodium phosphate and sodium silicate, and then adding casein.

11. The process of making a glue which consists in digesting vegetable fibers in an alkaline solution, disintegrating the fibers and removing moisture therefrom, converting the fibers into viscose, adding soya bean meal and then adding the mixture to a solution containing sodium hydroxide, trisodium phosphate, sodium silicate and sodium chloride.

12. The process of making a glue which consists in digesting vegetable fibers in an alkaline solution, disintegrating the fibers and removing moisture therefrom, converting the fibers into viscose, adding casein to the mass, and then adding the mixture to a solution containing sodium hydroxide, trisodium phosphate, sodium silicate and sodium chloride.

13. The process of making a glue which consists in digesting vegetable fibers in an alkaline solution, disintegrating the fibers, removing moisture therefrom, converting the fibers into viscose, adding cottonseed meal to the mass, and then adding the mixture to a solution containing sodium hydroxide, trisodium phosphate, sodium silicate and sodium chloride.

14. The process of making a glue which consists in digesting vegetable fibers in an alkaline solution, disintegrating the fibers and removing moisture therefrom, converting the fibers into viscose, adding peanut meal to the mass, and then adding the mixture to a solution containing sodium hydroxide, trisodium phosphate, sodium silicate and sodium chloride.

15. The process of making a glue which consists in digesting vegetable fibers in an alkaline solution, disintegrating the fibers and removing moisture therefrom, then converting the fibers into viscose, adding meal from leguminous seeds to the mass, and then adding the mixture to a solution containing sodium hydroxide, trisodium phosphate, sodium silicate and sodium chloride.

OTIS JOHNSON.